(12) United States Patent
Albert

(10) Patent No.: US 11,324,198 B2
(45) Date of Patent: May 10, 2022

(54) PET COSTUME KIT

(71) Applicant: Allison Albert, New Orleans, LA (US)

(72) Inventor: Allison Albert, New Orleans, LA (US)

(73) Assignee: PET KREWE, INC., New Orleans, LA (US)

( * ) Notice: Subject to any disclaimer, the term of this patent is extended or adjusted under 35 U.S.C. 154(b) by 195 days.

(21) Appl. No.: 16/692,154

(22) Filed: Nov. 22, 2019

(65) Prior Publication Data

US 2021/0153459 A1 May 27, 2021

(51) Int. Cl.
*A01K 13/00* (2006.01)

(52) U.S. Cl.
CPC .................................. *A01K 13/006* (2013.01)

(58) Field of Classification Search
CPC ............................ A01K 13/006; A01K 13/008
See application file for complete search history.

(56) References Cited

U.S. PATENT DOCUMENTS

| | | | | |
|---|---|---|---|---|
| 4,823,540 A | * | 4/1989 | Kosarek | A01K 13/008 54/80.1 |
| 5,060,458 A | * | 10/1991 | Curtis | A01K 13/006 54/79.2 |
| 5,361,563 A | * | 11/1994 | Llamas | A01K 13/008 54/79.2 |
| 6,209,140 B1 | * | 4/2001 | Ebeling | A01K 13/006 119/792 |
| 2002/0078905 A1 | * | 6/2002 | Wilson | A01K 13/006 119/850 |
| 2002/0088410 A1 | * | 7/2002 | Burnett | A01K 13/006 119/850 |
| 2003/0061790 A1 | * | 4/2003 | Longtin | B68C 5/00 54/79.2 |
| 2010/0277945 A1 | * | 11/2010 | Hurwitz | A01K 13/003 362/570 |
| 2013/0066409 A1 | * | 3/2013 | Hilton | A01K 13/006 607/110 |

FOREIGN PATENT DOCUMENTS

GB          2471098 A   * 12/2010   ........... A01K 13/008

* cited by examiner

*Primary Examiner* — Trinh T Nguyen
(74) *Attorney, Agent, or Firm* — Patterson Thuente Pedersen, P.A.

(57) ABSTRACT

A DIY pet costume kit could allow a pet owner to efficiently and easily customize pet accessories to bond with a pet. The DIY pet costume kit could include pet-safe equipment for the customization of included pet accessories.

12 Claims, 3 Drawing Sheets

PET COSTUME KIT

TECHNICAL FIELD

This disclosure relates generally to a pet costume kit for customizing pet accessories, specifically to a do-it-yourself (DIY) pet costume kit combining instructions, customization equipment comprising non-toxic material, and pet accessories.

BACKGROUND

Pet owners frequently desire ways to bring their pets into the family fold. Dressing pets in fashionable or themed accessories is one common method used to bond with pets. Traditionally, pet owners have dressed their pets in apparel items made for humans, such as hats or small clothing. These apparel items were not designed for pet use and may pose risks to pets by restricting movement and introducing choking hazards. Further, these apparel items are not conducive to customization that may be desired by pet owners.

Dressing pets in pet accessories can also improve safety. Walking a pet during dusk or nighttime hours can be hazardous in situations where vehicles are frequently encountered, particularly if the pet is small or prone to escape. A pet accessory can improve the visibility of the pet by incorporating high visibility colors and materials, reducing the risk of accidents. Additionally, pet accessories can protect a pet from inclement weather and provide warmth in cold climates.

Pet accessories also can make pets more approachable for young children or people who might otherwise be afraid to interact with the pet. Large dogs can often be intimidating for those who are not used to being around animals, but dressing large dogs in accessories can make them appear more approachable, particularly to children.

Conventional crafting kits not designed for pets often prove hazardous as many materials included in these kits, such as oil paints or glitter, can be harmful if ingested by pets. Further, accessories included in conventional crafting kits are typically not sized appropriately for pets. Improperly fitted accessories can restrict the movement of a pet or fall off during active periods.

Conventional approaches to designing pet accessories are not conducive to being customizable or DIY. Many pet owners may see customizing a pet accessory as an outlet to bond with a pet. Personally coloring or designing pet accessories allows a pet owner to display their creativity and love for their pet in a more visceral way than simply buying a product online. Recently, there has been a rise in consumer interest in DIY activities as consumers desire more ways to control their environmental footprint and meaningfully interact with products. This sentiment towards DIY is reflected in the rise of, for example, recipe delivery services for at-home cooking. DIY projects also can allow an individual to be more environmentally conscience by providing flexibility and control over the use (and reuse) and disposal of equipment involved in the project. DIY projects can also allow for gradual or repeated customization of a product.

One conventional approach to pet accessories involves taking a well-known figure, such as Santa Claus, and designing a pet outfit to make the pet resemble the chosen figure. This approach requires a predefined design and does not allow pet owners to personalize pet outfits to reflect the name, breed, or personality of their pet. Other types of conventional pet outfits are designed to look like food or other common items but similarly fail to provide pet owners with a personalized or DIY pet accessorizing experience.

A second conventional approach to pet accessories involves a pet owner personalizing pet accessories, such as bandanas, by choosing a print or logo. This personalization approach can provide the pet owner with a basic level of customization over pet accessories but typically incorporates designs and logos not designed by the pet owners themselves. When the pet owner does design a graphic to be used on such a pet accessory, the pet accessory with the graphic is entirely manufactured by a third party. Therefore, this conventional approach of personalizing products before production leaves no room for DIY customization of the pet accessory. This lack of post-production customization is apparent when a pet owner desires to dress their pet for multiple occasions. For example, if a pet owner wanted to dress their pet with a themed accessory for both Halloween and Christmas, the pet owner must purchase a new accessory for each holiday, increasing cost and waste.

Conventionally, pet owners desiring a DIY experience must personally design or research a project to determine necessary supplies, locate pet-safe versions of the supplies, and purchase the supplies, often requiring multiple trips or purchases from different suppliers. The inefficiencies of this process are abundant. First, the pet owner must research or create both a list of necessary supplies and a design for crafting complex elements of the project. Second, there is a substantial search cost associated with tracking down supplies, particularly when considering the supplies should be non-toxic for pets. Third, a pet owner might be forced to purchase excess materials if only set quantities of each material are available for purchase, increasing waste and cost. Fourth, elements of the desired project may be too complex for the pet owner's skill level, such as intricately sewing accents onto fabric.

SUMMARY

Embodiments of the present disclosure present a do-it-yourself pet costume kit including customization equipment comprising material that is non-toxic to pets, a set of instructions for using the at least one customization equipment, a first pet accessory configured to be worn on the head of a pet, a second pet accessory configured to be worn by the pet, and a container configured to store the other contents of the kit.

In embodiments, the customization equipment of the DIY pet costume kit can be at least one of markers, paints, iron-on patches, dyes, buttons, pins or stickers. In embodiments, the customization equipment can be configured to reveal hidden colors on the pet accessories.

In embodiments, the DIY pet costume kit can include a plurality of pet accessories. In embodiments, pet accessories included in the DIY pet costume kit are at least one of bows, crowns, hats, hoods, masks, bandanas, bodysuits, capes, collars, pants, shoes, skirts, socks, or stockings In embodiments, the DIY pet costume kit can include at least one pet accessory with a design template. In embodiments, the design template can be at least one of a colorable scene, a color-by-number, a border. In embodiments, the design template can be a position indicator suggesting a location to attach buttons, pins, or other customization equipment. In embodiments, the design template can be substantially the same on multiple pet accessories.

In embodiments, the DIY pet costume kit can include at least one pet accessory with a fastener to secure the at least one pet accessory to the pet. In embodiments, the fastener can be at least one of Velcro, clips, tie straps, adjustable clasps, adjustable hook and loop straps, elastic cords, buttons, or snaps. In embodiments, each pet accessory in the DIY pet costume kit can include a different fastener.

In embodiments, a set of instructions included in the DIY pet costume kit can include instructions for creating at least one design on the first pet accessory or the second pet accessory. In embodiments, the set of instructions can comprise instructions for cleaning each pet accessory.

In embodiments, the container used can include a removable stencil to stimulate a pet owner's design process.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
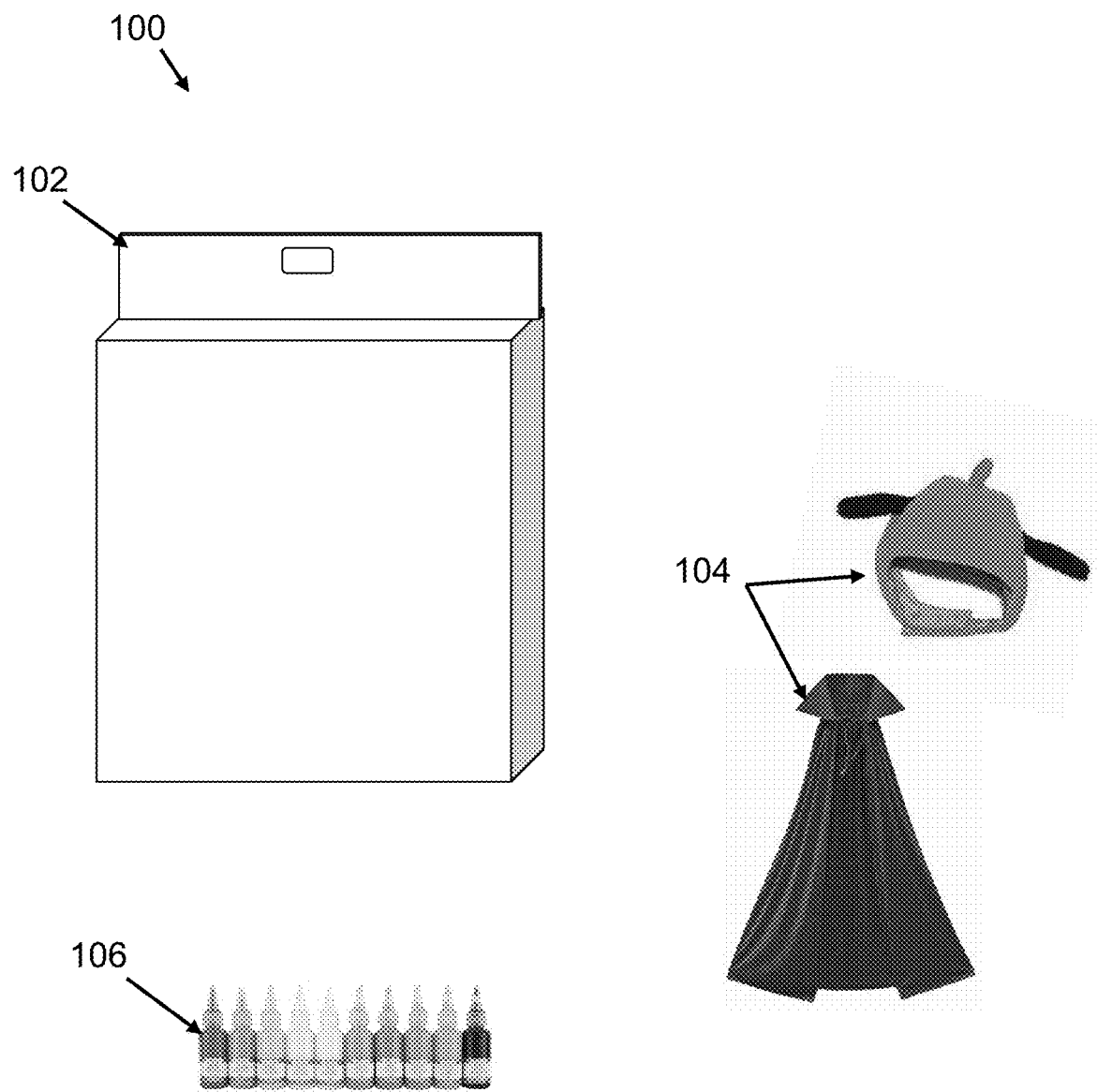
FIG. 1 is front view of contents to be included as part of a DIY pet costume kit according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, elements of a DIY pet accessories kit 100 is depicted according to an embodiment. In an embodiment, DIY pet costume kit 100 includes a container 102, at least one pet accessory 104, at least one pet-safe customization equipment 106, and instructions. Container 102 is designed to transport and store at least one pet accessory 104, at least one pet-safe customization equipment 106, and instructions.

Figure 2:
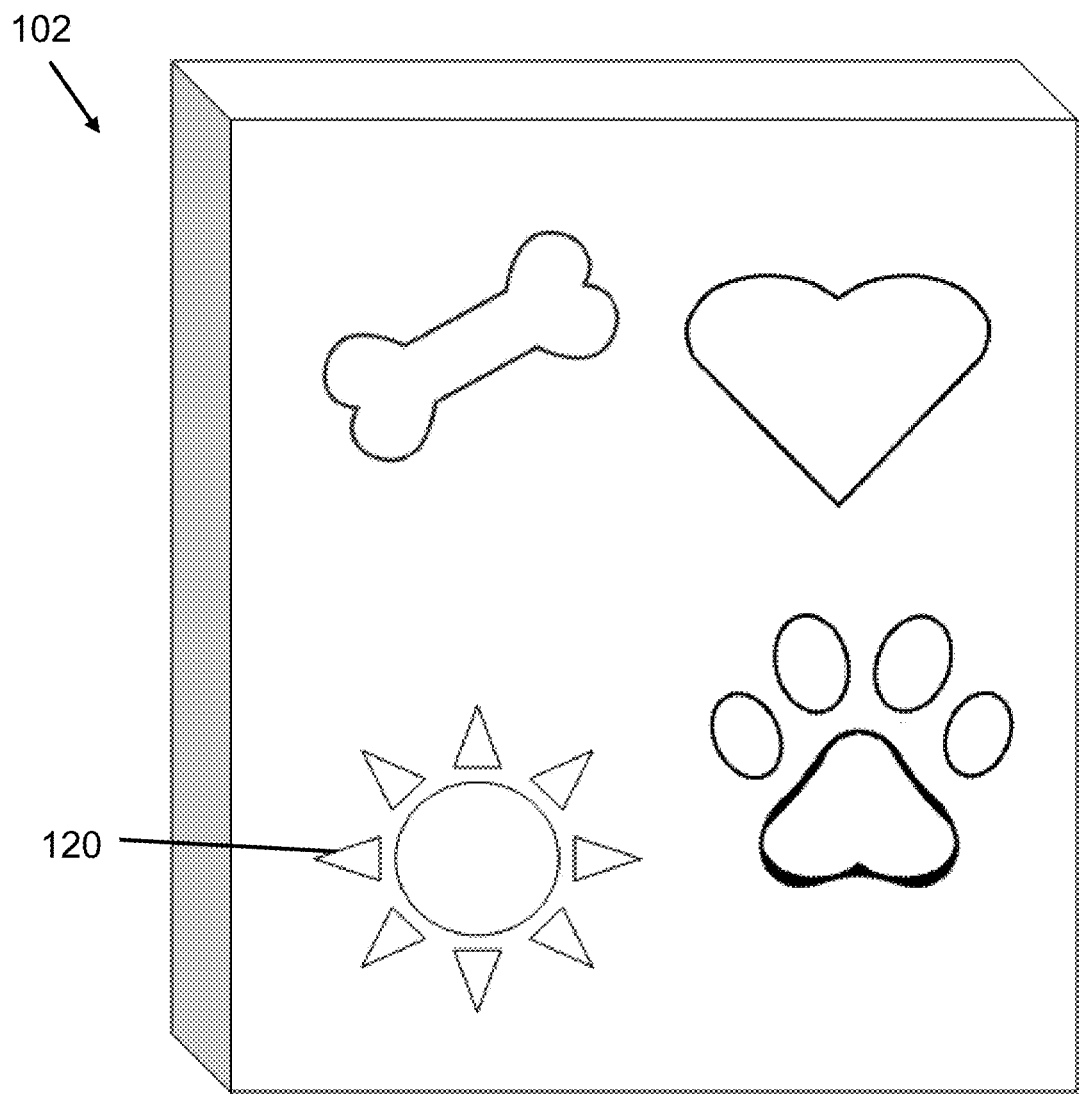
FIG. 2 is a back view of a container including stencils according to an embodiment.

Referring to FIG. 2, in one embodiment container 102 can include at least one pre-drawn or perforated stencil 120. In embodiments, container 102 can be made of cardboard, heavy paper or another easily cuttable material, or can comprise plastic or some other material. At least one stencil 120 can be outlined on a wall of container 102 such that a pet owner can cut around the outline to separate at least one stencil 120 from container 102. In some embodiments, container 102 can include predesigned graphics that can be traced by a pet owner.

In other embodiments, the material of container 102 can enable it to be easily recyclable, compostable, or reusable. For example, container 102 can be made of metal. In still other embodiments, container 102 can be converted into a pet toy, such as a ball, or a bed or crawl space for a cat. Container 102 also can be made from edible materials such that it can be safely eaten by a pet. For example, container 102 can be made from rice and wafer paper or be packed with edible or compostable packing peanuts.

Figure 3:
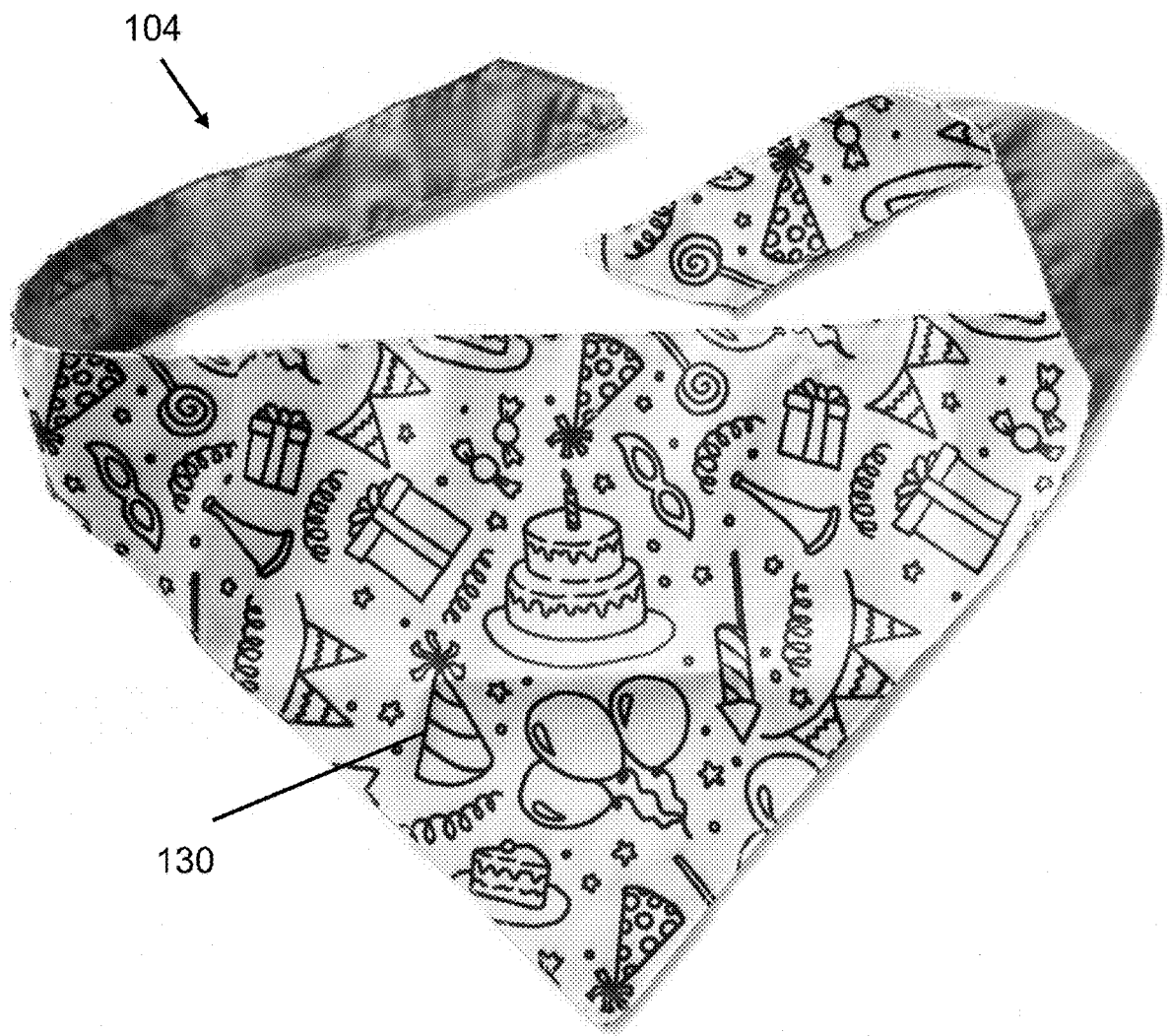
FIG. 3 is a front view of a pet accessory with a design template according to an embodiment.

Referring to FIG. 3, in an embodiment DIY pet costume kit 100 includes at least one pet accessory 104. In embodiments, the at least one pet accessory 104 is specifically sized and designed to be worn by a dog or cat. Thus, DIY pet costume kit can be offered in a variety of sizes or styles to accommodate different animals, breeds, or sizes. In embodiments, at least one pet accessory 104 can include at least one of a bandana, a bodysuit, a bow, a cape, a collar, a crown, a headband, a hat, a hood, a mask, pants, a skirt, shoes, socks, or stockings, or some other wearable item.

In embodiments, DIY pet costume kit 100 can include a plurality of pet accessories designed with a common theme. For example, DIY pet costume kit 100 can include an orange pumpkin hat and orange bodysuit with each accessory providing a pet owner with ample room to create jack-o-lantern designs for a Halloween aesthetic. In embodiments, DIY pet costume kit 100 can include at least one pet accessory to be worn on the head of a pet and at least one pet accessory to be worn elsewhere on a pet.

As previously mentioned, the at least one pet accessory 104 can be available in different pet appropriate sizes to allow for a precise fit for each pet. In embodiments, a DIY pet costume kit 100 can include a plurality of differently sized pet accessories. For example, a DIY pet costume kit 100 can include a pet crown and a pet bodysuit each sized based on specific pet neck and body measurements provided by the pet owner. In embodiments, sizing of pet accessories can be based on the body, neck, and chest measurements of a pet. In embodiments, selection of a DIY pet costume kit 100 can be based on a sizing chart with recommendations of accessory sizes for various ranges of pet measurements. In embodiments, breed suggestions can be incorporated into a pet accessory size selection chart. In embodiments, sizes of pet accessories can be generalized into categories, such as small, medium, large, and extra large. In embodiments, approximate weight based on the size of pet accessories can be included in a pet accessory size selection chart. In some embodiments, DIY pet costume kit 100 can include accessories that fit a range of sizes and can be customized for a particular pet size by the kit user.

The at least one pet accessory 104 can include a fastener, wherein the fastener is one or more of Velcro, clips, tie straps, adjustable clasps, adjustable hook and loop straps, elastic cords, buttons, zippers or snaps to securely fit pet accessory 104 onto a pet. The fastener can be designed to hold the at least one pet accessory 104 in place on the pet during periods of activity. In embodiments, the fastener can be pet-safe by preventing the costume from coming off of the pet and being eaten while not being overly restrictive of the pet's movement or breathing, or by being easily releasable if caught on an object in order to prevent choking.

In embodiments, at least one pet accessory 104 can include a design template 130 to simplify the DIY creation process. In embodiments, design template 130 can be a freely colorable scene or a color-by-number design. In embodiments, design template 130 can include position indicators for buttons, pins, or other attachable elements to aid a pet owner in creating a costume. In embodiments, design template 130 can include dotted lines to indicate where a pet owner should cut the at least one pet accessory 104. In embodiments, design template 130 can be a border around the edges of at least one pet accessory 104. In embodiments, design template 130 can be washed off or otherwise erased from pet accessory 104 by a pet owner. In embodiments, design template 130 may only be visible when pet accessory 104 is wet. In embodiments, design template 130 may only be visible when pet accessory 104 is within a certain temperature range. In embodiments, design template 130 can include one or more colors. In embodiments, multiple pet accessories included in a DIY pet costume kit 100 can have the same design template 130. In other embodiments, each pet accessory included in a DIY pet costume kit 100 can have different design templates. In embodiments, a pet owner can select a predesigned template or create their own to be printed onto pet accessory 104.

In embodiments, at least one pet-safe customization equipment 106 comprises material that is non-toxic to pets. In embodiments, pet-safe customization equipment 106 can include at least one of markers, iron-on patches, paints, colored dyes, glitter sheets, buttons, pins, or stickers. In embodiments, pet-safe customization equipment can include glow in the dark or high visibility properties, such as glow in the dark markers or reflective stickers. In some embodiments, the at least one pet-safe customization equipment 106 can draw colors out of at least one pet accessory 104. In embodiments, the at least one pet-safe customization equipment 106 is removable from the at least one pet accessory 104 after application. For example, in embodiments, the at least one pet-safe customization equipment 106 can be washable markers or removable iron-ons.

In embodiments, design template 130 can be chosen based on at least one pet-safe customization equipment 106. For example, design template 130 can be a colorable scene if at least one pet-safe customization equipment 106 is a set of markers. In another embodiment, design template 130 can include a series of placement indicators if at least one pet-safe customization equipment 106 is iron-on patches.

In embodiments, DIY pet costume kit 100 can include instructions for customizing the at least one pet accessory 104 with the at least one pet-safe customization equipment 106. In embodiments, instructions can include a step-by-step drawing tutorial illustrating how a user can create certain designs on the at least one pet accessory 104. In embodiments, instructions can include safety or use information for the at least one pet-safe customization equipment. In embodiments, instructions can illustrate steps for converting container 102 into a pet toy, such as a ball or crawl space for a cat. In embodiments, instructions can include information on the proper methods of cleaning pet accessory 104. In embodiments, instructions can include information on the proper methods of disposal for pet-safe customization equipment 106.

In operation, different combinations of the at least one pet accessory 104 and the at least one pet-safe customization equipment 106 within DIY pet costume kit 100 allow pet owners to create one-of-a-kind pet accessories that are non-toxic and safe. The DIY pet costume kit provides each pet owner with the necessary pet-safe supplies for the DIY project, allows for individual expression, and affords the pet owner an opportunity to bond with their pet. In embodiments, the inclusion of a plurality of pet accessories in a DIY pet costume kit can provide a more complete DIY experience and cohesive look for a pet.

In embodiments, container 102 can facilitate the pet accessory design process by incorporating additional customization elements and aids. Stencil 120 can be used as a drawing guide by tracing the design onto the at least one pet accessory 104, or stencil 120 can be cut out used as an outline. Predesigned graphics on container 102 can also be traced by a pet owner and serve as a starting point to encourage the pet owner's own creativity. Additionally, container 102 can be broken down and used as a drawing surface, ironing board, or backdrop to reduce potential mess produced by the at least one pet-safe customization equipment 106.

In an embodiment, a DIY pet costume kit can comprise a container with Halloween themed stencils, the container storing a pet hat styled as a pumpkin, an orange pet bodysuit, glow in the dark puffy paints, and instructions for using the glow in the dark puffy paints. In this embodiment, a pet owner could cut the stencils from the container after removing the pet hat and glow in the dark puffy paints. Then the pet owner could place the stencils on the pet hat or pet bodysuit and, following the use instructions, apply the glow in the dark puffy paint to create a one-of-a-kind Halloween costume for a pet. During this process the pet owner can select the colors, placement, and finishing details of a design for the pet costume. For example, one pet owner can choose to paint a scary glow in the dark jack-o-lantern with jagged teeth while another pet owner can choose to paint a smiling jack-o-lantern. Additionally, the use of glow in the dark puffy paint can increase the visibility of a pet wearing the pet hat in the dark such as during nighttime walks or while trick-or-treating.

In another embodiment, a DIY pet costume kit can comprise a container storing a pet crown, a colorful pet collar, stickers, and markers. In this embodiment, a child can draw a design on one side of the pet crown and then flip the pet crown to a second side to create a second design. In embodiments, the pet crown can include a design template to be colored in by the child. During the drawing process the container can be used as a placemat to prevent accidental marks being made on a surface beneath the pet crown. Stickers can be placed around the colorful pet collar allowing for further customization. When the DIY process is complete, the pet crown and colorful pet collar can make a pet more approachable to an intimidated child.

In yet another embodiment, a DIY pet costume kit can include a container storing a bow, a pre-hemmed bandana, pet socks, four washable fabric markers, a removable iron-on, and cleaning instructions. In this embodiment, the bow, hemmed bandana, and pet socks may be repeatedly customized by a pet owner because the pet-safe customization equipment can be removed and reapplied. This embodiment is an environmentally friendly and cost-effective way to create a DIY costume for every holiday.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art.

Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A do-it-yourself pet costume kit, comprising:
   at least one customization equipment comprising material that is non-toxic to pets, wherein the at least one customization equipment is at least one of markers, paints, iron-on patches, dyes, buttons, pins or stickers;
   a first pet accessory configured to be worn on the head of a pet comprising:
      a first fastener, and
      a first design template configured for use with the at least one customization equipment;
   a second pet accessory configured to be worn by the pet comprising:
      a second fastener, and
      a second design template configured for use with the at least one customization equipment;
   a set of instructions for using the at least one customization equipment; and
   a container configured to hold the at least one customization equipment, the first pet accessory, the second pet accessory, and the set of instructions.

2. The do-it-yourself pet costume kit of claim 1, wherein the first design template is at least one of a colorable scene, a color-by-number, a border, or a position indicator, the position indicator suggesting a location to attach the at least one customization equipment.

3. The do-it-yourself pet costume kit of claim 1, wherein the second design template is at least one of a colorable scene, a color-by-number, a border, or a position indicator, the position indicator suggesting a location to attach the at least one customization equipment.

4. The do-it-yourself pet costume kit of claim 1, wherein the first design template and the second design template are substantially the same.

5. The do-it-yourself pet costume kit of claim 1, wherein the first pet accessory is one of bows, crowns, hats, hoods, or masks.

6. The do-it-yourself pet costume kit of claim 1, wherein the second pet accessory is one of bandanas, bodysuits, capes, collars, pants, shoes, skirts, socks, or stockings.

7. The do-it-yourself pet costume kit of claim 1, wherein the first fastener is one of clips, tie straps, adjustable clasps, adjustable hook and loop straps, elastic cords, buttons, or snaps.

8. The do-it-yourself pet costume kit of claim 1, wherein the second fastener is one of clips, tie straps, adjustable clasps, adjustable hook and loop straps, elastic cords, buttons, or snaps.

9. The do-it-yourself pet costume kit of claim 1, wherein the set of instructions further comprises instructions for creating a design on the first pet accessory or the second pet accessory.

10. The do-it-yourself pet costume kit of claim 1, wherein the set of instructions further comprises instructions for cleaning the first pet accessory or the second pet accessory.

11. The do-it-yourself pet costume kit of claim 1, wherein the container further comprises a removable stencil.

12. The do-it-yourself pet costume kit of claim 1, wherein the at least one customization equipment is configured to reveal hidden colors on the first pet accessory or the second pet accessory.

* * * * *